United States Patent
Kamel et al.

(10) Patent No.: US 8,178,782 B2
(45) Date of Patent: May 15, 2012

(54) HIGH VOLTAGE ELECTRICAL CABLE ASSEMBLY

(75) Inventors: Sherif I. Kamel, Cary, NC (US); Kathryn Marie Maher, Cary, NC (US); Owen Gregory, Apex, NC (US)

(73) Assignee: Tyco Electronics Corporation, Berwyn, PA (US)

( * ) Notice: Subject to any disclaimer, the term of this patent is extended or adjusted under 35 U.S.C. 154(b) by 431 days.

(21) Appl. No.: 12/615,343

(22) Filed: Nov. 10, 2009

(65) Prior Publication Data

US 2010/0116549 A1     May 13, 2010

Related U.S. Application Data

(60) Provisional application No. 61/113,307, filed on Nov. 11, 2008.

(51) Int. Cl.
*H02G 15/02* (2006.01)
(52) U.S. Cl. .......................... 174/74 R; 174/78
(58) Field of Classification Search ................ 174/74 R, 174/76, 77 R, 79, 84 R, 89, 93, 94 R, 84 C, 174/70 A
See application file for complete search history.

(56) References Cited

U.S. PATENT DOCUMENTS

| | | | | |
|---|---|---|---|---|
| 4,234,755 A | * | 11/1980 | Simons | 174/19 |
| 4,431,861 A | * | 2/1984 | Clabburn et al. | 174/73.1 |
| 4,551,915 A | * | 11/1985 | Larsson | 29/858 |
| 5,374,784 A | * | 12/1994 | Wentzel | 174/73.1 |
| 6,015,629 A | * | 1/2000 | Heyer et al. | 428/625 |
| 7,431,599 B2 | * | 10/2008 | Luzzi | 439/181 |
| 2004/0099434 A1 | * | 5/2004 | Balconi et al. | 174/88 R |

* cited by examiner

*Primary Examiner* — William Mayo, III
(74) *Attorney, Agent, or Firm* — Myers Bigel Sibley & Sajovec, P.A.

(57) ABSTRACT

An electrical cable includes a core having a conductor, insulation surrounding the conductor, and an outer sheath surrounding the core. A portion of the conductor is stripped bare at a free end and a cavity is formed within the insulation at the cable free end. First and second shims are concentrically secured to the exposed portion of the conductor such that end portions of the shims are positioned adjacent to the cavity. The bare conductor is secured within a barrel portion of a terminal lug. A first sealing mastic material is disposed within the cavity and heated to encapsulate end portions of the shims. A second sealing mastic material is applied around the lug barrel portion, first and second shims, and a portion of the outer sheath. A heat shrinkable tube having an inner surface of zinc oxide stress control mastic material is secured around the second sealing mastic material.

14 Claims, 1 Drawing Sheet

HIGH VOLTAGE ELECTRICAL CABLE ASSEMBLY

RELATED APPLICATION

This application claims the benefit of and priority to U.S. Provisional Patent Application No. 61/113,307, filed Nov. 11, 2008, the disclosure of which is incorporated herein by reference as if set forth in its entirety.

FIELD OF THE INVENTION

The present invention relates generally to electrical cables and, more particularly, to electrical cable terminations.

BACKGROUND

Oil exploration companies utilize electrical heater cables in some subterranean wells during the process of oil extraction. These cables may be subjected to harsh conditions and may be used at high voltage levels. As such, improved electrical cables are constantly being sought by the oil exploration industry.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

According to some embodiments of the present invention, an electrical cable includes a termination assembly that is configured to withstand the harsh environments encountered in oil exploration. According to some embodiments, an electrical cable includes a core having a conductor, insulation surrounding the conductor, and an outer sheath surrounding the core. To install the termination assembly on the conductor, a portion of the conductor is stripped bare at a free end of the cable. As such, the cable has a free end with the bare conductor extending outwardly therefrom. A cavity then is formed within the insulation at the cable free end.

A first sealing mastic material is disposed within the cavity and then heated to fill the cavity. First and second tubular shims are concentrically secured to the exposed portion of the conductor such that end portions of the first and second shims are positioned adjacent to the cavity and immersed in the first sealing mastic. The free end of the bare conductor is inserted within and secured to a barrel portion of a terminal lug. A second sealing mastic material is applied around the lug barrel portion, the first and second shims, and a portion of the outer sheath. A heat shrinkable tube having an inner surface of zinc oxide (ZnO) stress control mastic material then is secured around the second sealing mastic material. In some embodiments, the first and second shims are FCSM (flame retarded cable sleeve—metric) tubing formed from ethylene vinyl acetate copolymer (EVA) or WCSM (wire cable sleeve—metric) tubing formed from cross-linked low density polyethylene and the first and second sealing mastic materials are EPDM (ethylene propylene diene monomer) rubber. In some embodiments, the heat shrinkable tube is a high voltage (HVOT) tube of highly modified, polyolefin-based copolymer (EVA).

It is noted that aspects of the invention described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

DETAILED DESCRIPTION

Figure 1:
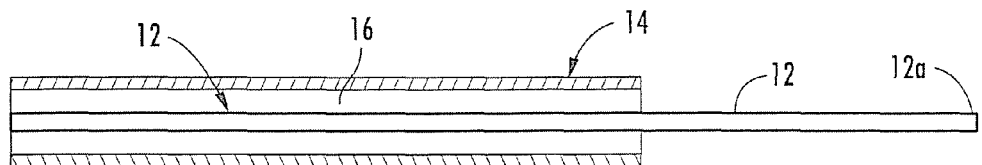
FIG. 1 is a side sectional view of an electrical cable having a central conductor extending outwardly from a free end of the cable after an outer sheath and insulation have been stripped from the conductor, in accordance with some embodiments of the present invention.

The present invention now is described more fully hereinafter with reference to the accompanying drawings, in which some embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present.

It will be understood that, although the terms "first", "second", etc. may be used herein to describe various elements, components, etc., these elements, components, etc. should not be limited by these terms. These terms are only used to distinguish one element, component, etc. from another element, component. Thus, a "first" element, or component discussed below could also be termed a "second" element or component without departing from the teachings of the present invention. In addition, the sequence of operations (or steps) is not limited to the order presented in the claims or figures unless specifically indicated otherwise.

FIGS. 1-4 illustrate operations for securing a termination assembly 10 to a free end 12a of a central conductor 12 of an electrical cable 14, according to some embodiments of the present invention. Referring initially to FIG. 1, the illustrated cable 14 includes a core having a central conductor 12 surrounded by insulation 16, such as, for example, magnesium oxide (MgO) insulation. The central conductor 12 and MgO insulation 16 are encased within an outer steel sheath 18. To prepare the cable 14 for the termination assembly 10, a portion of the insulation 16 and outer sheath 18 are removed adjacent a free end of the cable 14 to expose the central conductor 12, as illustrated in FIG. 1. In some embodiments, about five inches (5") of insulation 16 and outer sheath 18 are removed. However, different amounts of the insulation 16 and outer sheath 18 may be removed, without limitation. Embodiments of the present invention are not limited to any particular length of the insulation 16 and outer sheath 18 that is removed.

Figure 2:
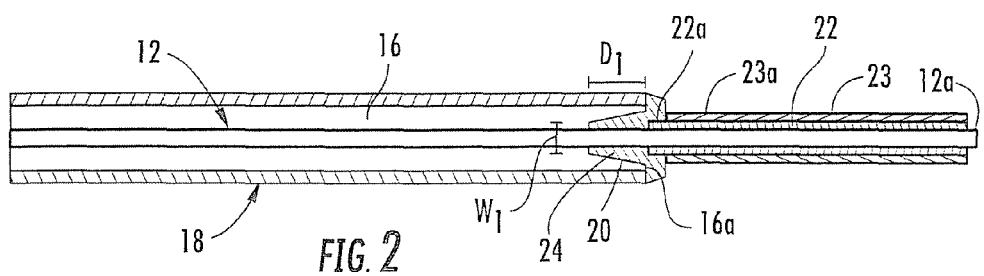
FIG. 2 illustrates the formation of a cavity in the insulation of the heater cable of FIG. 1, and the installation of the sealing mastic in the cavity and the concentric shims around the bare central conductor, according to some embodiments of the present invention.
Figure 3:
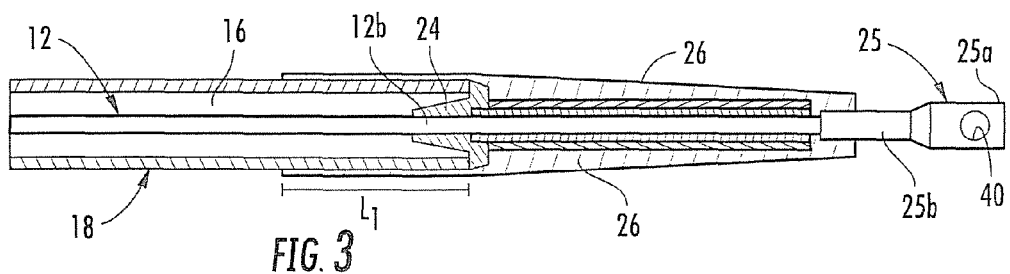
FIG. 3 illustrates a terminal lug secured to the free end of the bare central conductor of FIG. 2 and having sealing mastic installed therearound and around the shims, according to some embodiments of the present invention.

Referring to FIG. 2, a cavity 20 is formed within the exposed end 16a of the insulation 16, as illustrated. The illustrated cavity 20 has a substantially tapered or frusto-conical configuration with a trapezoid-shaped cross section, although other shapes may be utilized. The dimensions of the cavity 20 typically depend upon the size of the cable 14 and the central conductor 12. For a cable with a central conductor having a diameter of about 0.125 inches, an exemplary cavity may have a depth $D_1$ of about 0.4-0.5 inch and a width $W_1$ of about 0.2 inch at the bottom of the cavity 20. Mastic material 24 is added into the cavity 20 and is heated, for example via a heat gun. When heated, the mastic material 24 liquefies and fills the cavity 20, thereby purging air from the cavity 20. The liquefied mastic material 24 also surrounds a portion 12b of the central conductor 12 and the end portions 22a, 23a of the two shims 22, 23, as illustrated in FIG. 3. As illustrated in FIG. 3, the mastic material 24 may extend outwardly from the open end of the cavity 20. The heater cable 14 is oriented substantially vertically such that the insulation exposed end 16a is facing upwardly during the addition and liquefication of the mastic material 24. This orientation of the cable 14 is to prevent the liquefied mastic material 24 from leaking out of the cavity prior to solidification.

In some embodiments, the mastic material 24 is an EPDM (ethylene propylene diene monomer) rubber material as described in U.S. Pat. No. 5,952,396, which is incorporated herein by reference in its entirety. For example, the mastic material 24 may be a composition comprising: (a) between 20 and 45 parts by weight of a semicrystalline elastomer having between 1 and 15% crystallinity, and (b) between 80 and 55 parts by weight of a compatible liquid elastomer having a number-average molecular weight ($M_n$) of between 1,500 and 8,500. The EPDM rubber material is an elastomer having a modulus spanning those of rubbers and gels, enabling the elastomer to provide superior sealing compared to a rubber, but yet having sufficiently higher modulus than a gel so that it does not require a containing vessel.

Referring to FIG. 3, a first tubular shim 22 is installed on and concentrically around the central conductor 12. The first shim 22 has an end portion 22a positioned within the cavity 20 and embedded in the sealing mastic 24, as illustrated. A second tubular shim 23 is installed on and concentrically around the first shim 22. The second shim 23 has an end portion 23a that is longitudinally staggered relative to the end portion 22a of the first shim 22, as illustrated in FIG. 2, but this staggered relationship is not required. The end portion 23a of the second shim is positioned adjacent to the cavity 20, as illustrated. The two concentric shims 22, 23 may be, for example, FCSM (flame retarded cable sleeve—metric) tubing, and may be, for example, formed from ethylene vinyl acetate copolymer (EVA) or WCSM (wire cable sleeve—metric) tubing formed from cross linked low density polyethylene. However, the shims 22, 23 may be formed from various other polymeric or co-polymeric insulating materials.

Still referring to FIG. 3, a terminal lug 25 is secured to the free end 12a of the central conductor 12. The terminal lug 25 is a mechanical lug with a lug portion 25a and an opposite barrel portion 25b that is configured to receive the free end 12a of the central conductor therein. In some embodiments, the terminal lug 25 is a copper lug, but may be formed from other conductive materials. The lug portion 25a may include one or more apertures 40 which enable the lug 25 to be secured to whatever equipment the cable 14 is to be electrically connected to. The barrel portion 25b may be crimped around the central conductor 12 or some other method of creating a compression fit between the barrel portion 25b and the central conductor 12 may be utilized.

A layer of sealing mastic material 26 is wrapped around the barrel portion 25b, the shims 22, 23, and a portion of the outer sheath 18, as illustrated in FIG. 3. The mastic material 26 may extend over the outer sheath 18 by a length of about one inch (1") as indicated by $L_1$; however, embodiments of the present invention are not limited to this dimension. In some embodiments, the sealing mastic material 26 is an EPDM rubber-based mastic suitable for environmental sealing in medium voltage environments. However, other polymeric materials may be utilized, also.

Figure 4:
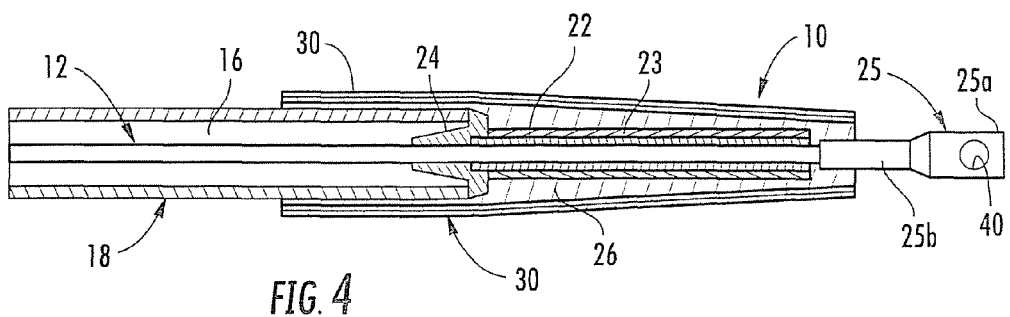
FIG. 4 illustrates an HVOT tube secured around the sealing mastic of FIG. 3, according to some embodiments of the present invention.

Referring to FIG. 4, a heat shrinkable high voltage (HVOT) tube 30 is installed over the sealing mastic material 26, as illustrated. In some embodiments, the HVOT tube 30 has an inner surface that is lined with zinc oxide (ZnO) stress control mastic material (not shown). The ZnO mastic material is co-extruded with the HVOT tube during manufacturing. The HVOT tube 30 may be formed from various polymeric materials. In some embodiments, the HVOT tube 30 is a highly modified, polyolefin-based copolymer (EVA) that is track resistant and UV (ultraviolet) stable. As understood by those skilled in the art, the HVOT tube 30 is secured around the sealing mastic material 26 by applying heat such that the HVOT tube 30 shrinks in place. The HVOT tube should extend over the sealing mastic 26 and make contact with the cable sheath 18.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. An electrical cable assembly, comprising:
   a core including a conductor and insulation surrounding the conductor, and an outer sheath surrounding the core, wherein the cable has a free end with a cavity formed within the insulation at the cable free end, wherein the conductor has an exposed portion that extends outwardly from the cable free end, and wherein the conductor has a respective free end; and
   a termination assembly secured to the cable, comprising:
      a terminal lug having a barrel portion and an opposite free end, wherein the conductor free end is secured within the barrel portion;
      a first sealing mastic material disposed within the cavity;
      a first shim secured to the exposed portion of the conductor, wherein the first shim has an end portion positioned adjacent to the cavity and embedded in the sealing mastic;
      a second sealing mastic material surrounding the lug barrel portion, the first shim, and a portion of the outer sheath; and
      a heat shrinkable tube secured around the second sealing mastic material.

2. The electrical cable assembly of claim 1, further comprising a second shim secured to the first shim, wherein the second shim has an end portion positioned adjacent to the cavity.

3. The electrical cable assembly of claim 2, wherein the first and second shims are tubular shims.

4. The electrical cable assembly of claim 3, wherein the first and second tubular shims are concentrically secured to the exposed portion of the conductor, wherein the first and second shims have end portions that are staggered relative to each other and that are positioned adjacent to the cavity.

5. The electrical cable assembly of claim 2, wherein the end portions of the first and second shims are staggered.

6. The electrical cable assembly of claim 2, wherein the first sealing mastic material encapsulates the end portions of the first and second shims, and wherein the second sealing mastic material surrounds the lug barrel portion, the first and second shims, and a portion of the outer sheath.

7. The electrical cable assembly of claim 2, wherein the second sealing mastic material surrounds the lug barrel portion, the second shim, and a portion of the outer sheath.

8. The electrical cable assembly of claim 2, wherein the first and second shims comprises FCSM (flame retarded cable sleeve—metric) tubing or WCSM (wire cable sleeve—metric) tubing or any other suitable insulating material.

9. The electrical cable assembly of claim 8, wherein the FCSM tubing comprises ethylene vinyl acetate copolymer (EVA) and the WCSM tubing comprises cross linked low density polyethylene.

10. The electrical cable assembly of claim 1, wherein the first sealing mastic material comprises EPDM (ethylene propylene diene monomer) rubber.

11. The electrical cable assembly of claim 1, wherein the second sealing mastic material comprises EPDM rubber.

12. The electrical cable assembly of claim 1, wherein the heat shrinkable tube has an inner surface comprising zinc oxide (ZnO) stress control mastic material.

13. The electrical cable assembly of claim 1, wherein the heat shrinkable tube is a high voltage (HVOT) tube.

14. The electrical cable assembly of claim 13, wherein the HVOT tube comprises highly modified, polyolefin-based copolymer (EVA).

* * * * *